(12) United States Patent
Kanamaru et al.

(10) Patent No.: US 12,104,814 B2
(45) Date of Patent: Oct. 1, 2024

(54) REMOTE MONITORING DEVICE AND AIR-CONDITIONING SYSTEM

(71) Applicant: Mitsubishi Electric Corporation, Tokyo (JP)

(72) Inventors: Minoru Kanamaru, Tokyo (JP); Yuto Taketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 594 days.

(21) Appl. No.: 17/427,516

(22) PCT Filed: Mar. 29, 2019

(86) PCT No.: PCT/JP2019/014135
§ 371 (c)(1),
(2) Date: Jul. 30, 2021

(87) PCT Pub. No.: WO2020/202295
PCT Pub. Date: Oct. 8, 2020

(65) Prior Publication Data
US 2022/0136727 A1 May 5, 2022

(51) Int. Cl.
*F24F 11/58* (2018.01)
*F24F 11/32* (2018.01)
*G05B 19/042* (2006.01)

(52) U.S. Cl.
CPC ............. *F24F 11/58* (2018.01); *F24F 11/32* (2018.01); *G05B 19/042* (2013.01); *G05B 2219/2614* (2013.01)

(58) Field of Classification Search
None
See application file for complete search history.

(56) References Cited

U.S. PATENT DOCUMENTS 9,853,826 B2 * 12/2017 Shuman ............... H04L 12/2809
10,082,309 B2 * 9/2018 Castillo ................. H04L 67/12
(Continued)

FOREIGN PATENT DOCUMENTS

JP   2007-085610 A   4/2007
JP   2016-167883 A   9/2016
(Continued)

OTHER PUBLICATIONS

Office Action dated May 17, 2022 issued in corresponding JP Patent Application No. 2021-510627 (and English translation).
(Continued)

*Primary Examiner* — Carlos R Ortiz Rodriguez
(74) *Attorney, Agent, or Firm* — Posz Law Group, PLC (57) ABSTRACT

A remote monitoring device communicates with an external device via a public communication line and sends, to an air-conditioning apparatus, an operation instruction signal for operating the air-conditioning apparatus. The remote monitoring device communicates with the external device via the public communication line, and communicates with the air-conditioning apparatus via a dedicated communication line. A monitoring-side data storage unit stores air-conditioning operation data set by a user of the air-conditioning apparatus that indicates operation contents of the air-conditioning apparatus for communication disruption. A disruption, and a monitoring-side control unit generates the operation instruction signal based on the air-conditioning operation data if communication with the external device via the public communication line is disrupted, and sends the operation instruction signal to the air-conditioning apparatus via the dedicated line.

10 Claims, 4 Drawing Sheets

(56) References Cited

U.S. PATENT DOCUMENTS 10,119,713 B2 *  11/2018  Castillo .................. F24F 11/523
10,139,122 B2 *  11/2018  Blair ........................ F24F 11/38

FOREIGN PATENT DOCUMENTS

| JP | 2017-108471 A | 6/2017 |
| JP | 2017-219253 A | 12/2017 |
| JP | 2018-035957 A | 3/2018 |
| WO | 2016/046861 A1 | 3/2016 |
| WO | 2019/058570 A1 | 3/2019 |

OTHER PUBLICATIONS

International Search Report of the International Searching Authority mailed Jun. 11, 2019 for the corresponding International application No. PCT/JP2019/014135 (and English translation).

* cited by examiner

| FACILITY NUMBER | OPERATING/ STOPPING | OPERATION MODE | SET TEMPERATURE | ROOM TEMPERATURE | HUMIDITY | $CO_2$ CONCENTRATION |
|---|---|---|---|---|---|---|
| 001 | OPERATING | COOLING | 27.0℃ | 28.5℃ | 65% | 320 ppm |
| 002 | OPERATING | COOLING | 26.0℃ | 26.4℃ | 60% | 280 ppm |

(b)

| ON/OFF TIMER | START TIME | STOP TIME | REPEAT EXECUTION |
|---|---|---|---|
| ENABLED | 08:30 | 17:00 | ENABLED |

| DATE AND TIME OF OCCURRENCE | UNIT OF ERROR OCCURRENCE | ERROR CODE | DATE AND TIME OF RECOVERY |
|---|---|---|---|
| 2010/08/01 08:11 | 01 | 6601 | 2010/08/01 08:25 |
| 2010/08/02 11:17 | 01 | 6607 | 2010/08/02 11:21 |
| 2010/08/04 13:42 | 02 | 6603 | 2010/08/04 14:12 |
| 2010/09/10 18:22 | 01 | 6607 | 2010/09/10 18:45 |
| 2010/10/12 09:56 | 02 | 6601 | 2010/10/12 10:05 |
| 2010/10/15 23:06 | 01 | 6608 | 2010/10/15 23:31 |

(b)

| DATE AND TIME | OPERATING/ STOPPING | OPERATION MODE | SET TEMPERATURE | ROOM TEMPERATURE | HUMIDITY |
|---|---|---|---|---|---|
| 08/01 00:00 | STOPPING | COOLING | 27℃ | 28.1℃ | 45.0% |
| 08/01 00:01 | STOPPING | COOLING | 27℃ | 28.3℃ | 46.0% |
| 08/01 00:02 | STOPPING | COOLING | 27℃ | 27.7℃ | 45.0% |
| 08/01 00:03 | STOPPING | COOLING | 27℃ | 27.5℃ | 46.0% |
| 08/01 00:04 | STOPPING | COOLING | 27℃ | 28.2℃ | 47.0% |
| 08/01 00:05 | STOPPING | COOLING | 27℃ | 28.2℃ | 46.0% |

FIG. 5

| APPARATUS MODEL | CODE NUMBER | TYPE NAME | USAGE PURPOSE |
|---|---|---|---|
| IC | 001 | ABC-DEF01 | FOR PEOPLE |
| IC | 011 | ABC-DEF11 | FOR ARTICLES |

FIG. 6

| OPERATION ITEM | FACILITY NUMBER | OPERATING/ STOPPING | OPERATION MODE | SET TEM- PERATURE |
|---|---|---|---|---|
| NO1 | 001 | OPERATING | NO CHANGE | NO CHANGE |
| NO2 | 002 | STOPPING | FAN | 24℃ |
| NO3 | 003 | NO CHANGE | NO CHANGE | NO CHANGE |

REMOTE MONITORING DEVICE AND AIR-CONDITIONING SYSTEM

CROSS REFERENCE TO RELATED APPLICATION

This application is a U.S. national stage application of International Application No. PCT/JP2019/014135, filed on Mar. 29, 2019, the contents of which are incorporated herein by reference.

TECHNICAL FIELD

The present disclosure relates to a remote monitoring device and an air-conditioning system that control an air-conditioning apparatus by using a cloud service, and more particularly, to a technique for securing safety.

BACKGROUND ART

By linking an air-conditioning system, which includes at least an air-conditioning apparatus and an air-conditioning apparatus monitoring device, with a cloud service, a user can perform remote monitoring and operation of the air-conditioning system via a smartphone, a tablet, a computer or other device. As a result, the degree of freedom in utilization is increased and thus the convenience of the user can be improved (see Patent Literature 1, for example).

CITATION LIST

Patent Literature

Patent Literature 1: Japanese Unexamined Patent Application Publication No. 2018-035957

SUMMARY OF INVENTION

Technical Problem

However, although the degree of freedom is increased, when a communication between the remote monitoring device and a cloud server providing the cloud service is disrupted due to a failure of the cloud server or other season, the user cannot operate the air-conditioning apparatus via the cloud service. Consequently, there is a possibility that the air-conditioning apparatus performs an operation different from an intention of the user.

In particular, in a case where the user uses a mobile terminal to remotely operate the air-conditioning apparatus, the user cannot acquire operation conditions of the air-conditioning apparatus when a communication disruption occurs. In addition, the remote monitoring device cannot receive an instruction given by an operation of the user. Therefore, even in such abnormal situations, the air-conditioning apparatus needs to be operated in a safe manner.

The present disclosure has been made to solve the above problems, and objects thereof are to provide a remote monitoring device that controls operation of an air-conditioning apparatus while securing safety when a signal communication with a cloud service is disrupted, and to provide an air-conditioning system having the same.

Solution to Problem

A remote monitoring device according to one embodiment of the present disclosure being configured to communicate with an external device via a public communication line and send, to an air-conditioning apparatus to be operated, an operation instruction signal for operating the air-conditioning apparatus, includes a monitoring-side line communication unit configured to communicate with the external device via the public communication line, a monitoring-side dedicated line communication unit configured to communicate with the air-conditioning apparatus via a dedicated communication line, a monitoring-side data storage unit storing air-conditioning operation data that is set by a user of the air-conditioning apparatus and indicates operation contents of the air-conditioning apparatus for a case of a communication disruption, and a monitoring-side control unit configured to generate the operation instruction signal based on the air-conditioning operation data when determining that a communication with the external device via the public communication line is disrupted, and send the operation instruction signal to the air-conditioning apparatus from the monitoring-side dedicated line communication unit.

Furthermore, an air-conditioning system according to another embodiment of the present disclosure includes the remote monitoring device described above and a cloud server configured to communicate with the remote monitoring device via a public communication line and send a signal to the remote monitoring device.

Advantageous Effects of Invention

According to an embodiment of the present disclosure, when the monitoring-side control unit determines that no operation instruction signal is sent from the external device, the monitoring-side control unit performs processing of transmitting an operation instruction signal to the air-conditioning apparatus based on the air-conditioning operation data stored in the monitoring-side data storage unit. Consequently, the remote monitoring device, which is capable of securing an operation that the user intends even when a communication disruption occurs between the external device and the remote monitoring device, can be provided.

DESCRIPTION OF EMBODIMENTS

An air-conditioning system having a remote monitoring device according to embodiments of the present disclosure will be described below with reference to the drawings. In the drawings, components denoted by the same reference symbols are the same or corresponding components, and the same applies hereinafter. In addition, the relationship of sizes of the components in the drawings may differ from that of actual ones. Further, the modes of components described herein are merely illustrative, and the present disclosure is not limited to those described herein. In particular, combinations of the components are not limited to the combinations in embodiments, and components described in one embodiment can be applied to another embodiment. Further, with regard to a plurality of devices of the same type which are distinguished by suffixes, in a case where the devices are not particularly required to be distinguished or specified, the suffixes are omitted in some cases.

Embodiment 1

Figure 1:
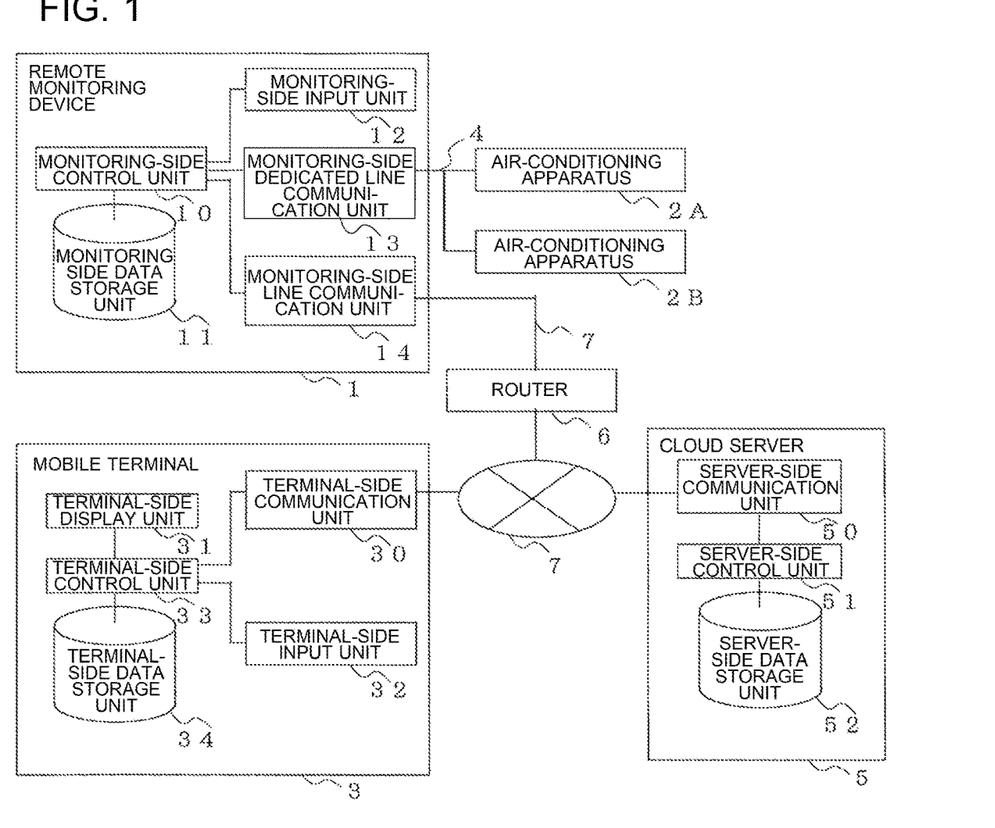
FIG. 1 is a diagram illustrating the configuration of an air-conditioning system centered on a remote monitoring device 1 of Embodiment 1.

FIG. 1 is a diagram illustrating the configuration of an air-conditioning system centered on a remote monitoring device 1 of Embodiment 1. As shown in FIG. 1, the air-conditioning system of Embodiment 1 includes a remote monitoring device 1, a plurality of air-conditioning apparatuses 2, a mobile terminal 3, a cloud server 5, a router 6 connecting between the remote monitoring device 1 and a public communication line 7.

First, the connection relation of devices forming the air-conditioning system will be explained. The remote monitoring device 1 and each of the air-conditioning apparatuses 2 (an air-conditioning apparatus 2A and an air-conditioning apparatus 2B in FIG. 1) are connected by a dedicated communication line 4 and configured to communicate with each other. For example, each of the air-conditioning apparatuses 2 transmits signals including model data, operation data, and other data to the remote monitoring device 1 via the corresponding dedicated communication line 4. The remote monitoring device 1 processes the transmitted signals. The remote monitoring device 1 then transmits an operation instruction signal for instructing an operation to the corresponding air-conditioning apparatus 2.

The remote monitoring device 1 and the cloud server 5 are connected via the router 6 and the public communication line 7 and configured to communicate with each other. In this case, the cloud server 5 is an external device to which the remote monitoring device 1 can connect for communication by using the public communication line 7. For example, the remote monitoring device 1 transmits signals including model data and operation data of each of the air-conditioning apparatuses 2 to the cloud server 5 via the router 6 and the public communication line 7. The cloud server 5 performs processing of storing the data in a server-side data storage unit 52, which will be described later, and other processing. The router 6 is a device that relays signals between a local area network (LAN) 7, to which the remote monitoring device 1 is connected, and the public communication line 7, to which the cloud server 5 is connected. When a monitoring-side line communication unit 14, which will be described later, has the same functions as the router 6, there is no need to place the router 6 between the remote monitoring device 1 and the public communication line 7.

Furthermore, the mobile terminal 3 and the cloud server 5 are connected via the public communication line 7 and configured to communicate with each other. For example, the cloud server 5 transmits signals including data on each of the air-conditioning apparatuses 2 to the mobile terminal 3 based on an instruction from the mobile terminal 3. The mobile terminal 3 processes the data included in the transmitted signals and causes a terminal-side display unit 31, which will be described later, to display operation conditions of the air-conditioning apparatuses 2. When a signal including an instruction for changing operation condition is transmitted from the mobile terminal 3 via the public communication line 7, the cloud server 5 transmits a signal including the instruction to the remote monitoring device 1 via the public communication line 7 and the router 6. The remote monitoring device 1 transmits the instruction included in the transmitted signal to the corresponding air-conditioning apparatus 2.

Next, the devices forming the air-conditioning system will be explained. Each of the air-conditioning apparatuses 2 includes devices (not shown) related to air-conditioning, such as an outdoor unit and an indoor unit, and performs air-conditioning. The air-conditioning apparatuses 2 perform air-conditioning in the corresponding air-conditioned spaces based on operation instruction signals transmitted from the remote monitoring device 1.

The remote monitoring device 1 processes signals including various kinds of data transmitted from the air-conditioning apparatuses 2 and other devices. The remote monitoring device 1 also transmits operation instruction signals to the air-conditioning apparatuses 2 so that operations to be performed by the air-conditioning apparatuses 2 are controlled. As shown in FIG. 1, the remote monitoring device 1 includes a monitoring-side control unit 10, a monitoring-side data storage unit 11, a monitoring-side input unit 12, a monitoring-side dedicated line communication unit 13, and a monitoring-side line communication unit 14.

The monitoring-side control unit 10 controls each unit included in the remote monitoring device 1 to control the entire remote monitoring device 1. In particular, the monitoring-side control unit 10 performs processing related to communication with the air-conditioning apparatuses 2 via the monitoring-side dedicated line communication unit 13 and processing related to communication with the cloud server 5 via the monitoring-side line communication unit 14. Then, the monitoring-side control unit 10 causes the monitoring-side data storage unit 11, which will be described later, to store data. The monitoring-side control unit 10 also performs processing of transmitting operation instruction signals to operate air-conditioning apparatuses 2.

In this case, the monitoring-side control unit 10 includes a control arithmetic processing device such as a central processing unit (CPU), for example. The monitoring-side control unit 10 also includes storage devices, as hardware, such as a volatile storage device (not shown) like a random access memory (RAM) capable of temporarily storing data, and a nonvolatile read only memory (ROM) like a flash memory capable of storing data in a long time.

The monitoring-side data storage unit 11 stores various kinds of data related to controls of the air-conditioning apparatuses 2. The monitoring-side data storage unit 11 includes storage devices, as hardware, such as a volatile storage device and a hard disk (not shown).

Figure 2:
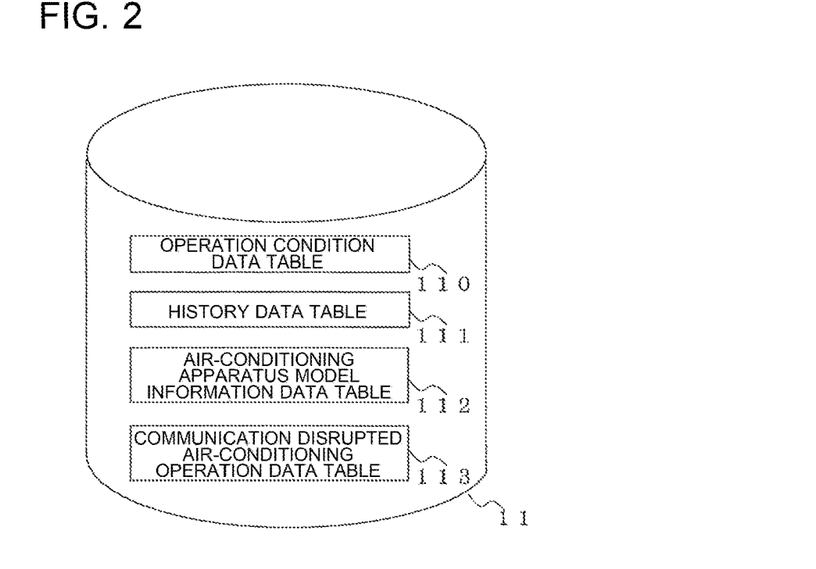
FIG. 2 shows data contents stored in a monitoring-side data storage unit 11 according to Embodiment 1.

FIG. 2 shows data contents stored in the monitoring-side data storage unit 11 according to Embodiment 1. As shown in FIG. 2, the monitoring-side data storage unit 11 of Embodiment 1 specifically stores data related to an operation condition data table 110, a history data table 111, an air-conditioning apparatus model information data table 112, and a communication disrupted air-conditioning operation data table 113.

Figure 3:
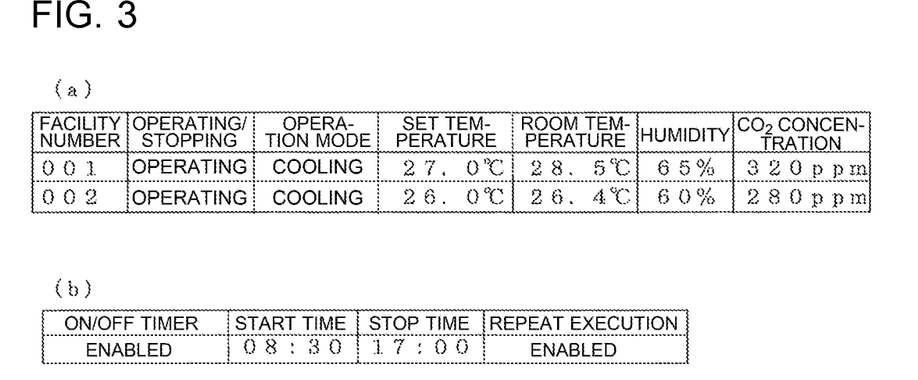
FIG. 3 shows data contents of an operation condition data table 110 according to Embodiment 1.

FIG. 3 shows data contents of the operation condition data table 110 according to Embodiment 1. Various kinds of information that a general user can manipulate and monitor are stored in the operation condition data table 110 as table format data. More specifically, data on current operation conditions and data on schedules are stored for each of the air-conditioning apparatuses 2. For example, data of operating/stopping, setting information such as an operation mode or a set temperature, data on a temperature such as a room temperature or a temperature of a certain part of a device, and data on schedule setting contents are stored. FIG. 3(*a*) shows an example in which items such as facility number, status of operating or stopping, operation mode, set temperature, room temperature, humidity, and carbon dioxide concentration are stored as the current operation conditions for each of the air-conditioning apparatuses 2. FIG. 3(*b*) shows an example in which setting items such as on/off timer, start time, end time, and repeat execution setting are stored as schedule data.

Figure 4:
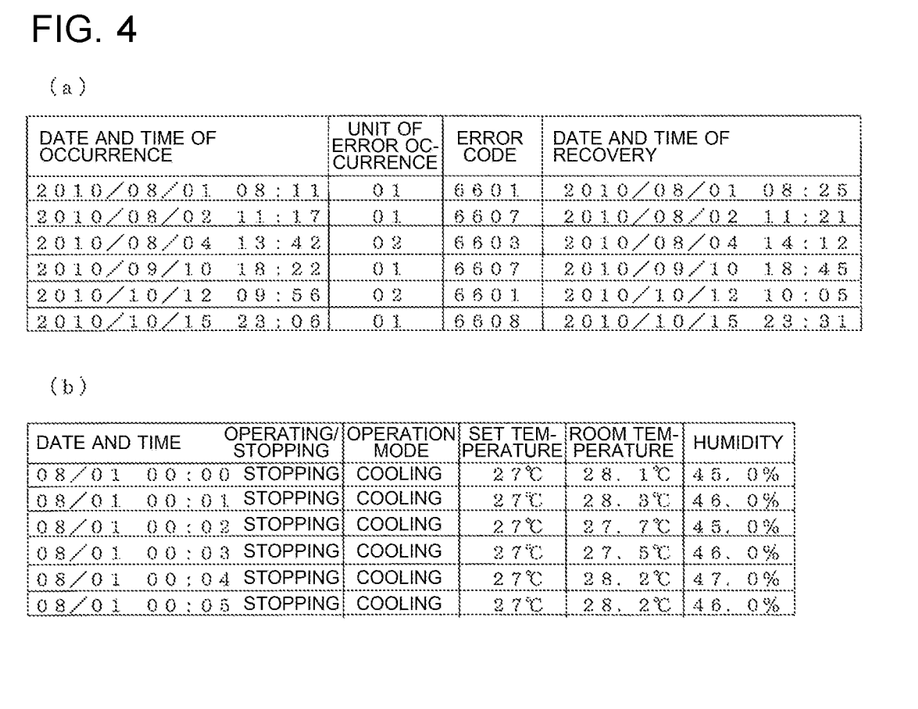
FIG. 4 shows data contents of a history data table 111 according to Embodiment 1.

FIG. 4 shows data contents of the history data table 111 according to Embodiment 1. Data that a service person, who performs maintenance on the air-conditioning apparatuses 2, uses to check the past operation conditions of the air-conditioning apparatuses 2 is stored in a table format in the history data table 111. More specifically, operation histories, control histories, error histories, trend data of sensor detection values extracted at fixed time intervals and other data are stored for each of the air-conditioning apparatuses 2. FIG. 4(*a*) shows an example in which items such as date and time of error occurrence, facility number of the air-conditioning apparatus 2 having the error, error code, and date and time of recovery are stored as an error history. FIG. 4(*b*) shows an example in which setting items such as date and time of detection, status of operating or stopping, operation mode, set temperature, room temperature, and humidity are stored as an operation condition and temperature trend of one of the air-conditioning apparatuses 2.

Figure 5:
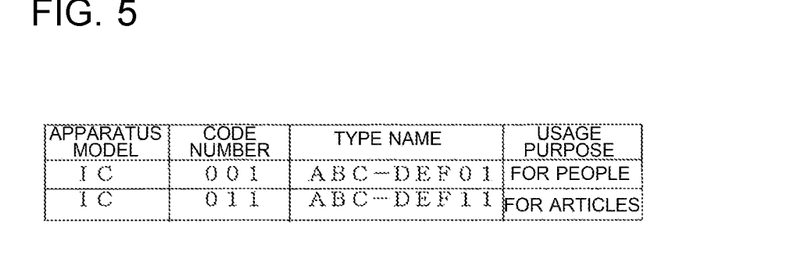
FIG. 5 shows data contents of an air-conditioning apparatus model information data table 112 according to Embodiment 1.

FIG. 5 shows data contents of the air-conditioning apparatus model information data table 112 according to Embodiment 1. Data related to model information of each of the air-conditioning apparatuses 2 is stored in a table format in the air-conditioning apparatus model information data table 112. The air-conditioning apparatus model information data table 112 is used by the monitoring-side control unit 10 to determine the model of each of the air-conditioning apparatuses 2. FIG. 5 shows an example in which setting items such as apparatus model, code number, type name, and usage purpose are stored as air-conditioning apparatus model information. The data in the air-conditioning apparatus model information data table 112 can be updated via the monitoring-side input unit 12 or the monitoring-side line communication unit 14. Thus, data corresponding to the release of a new model for the air-conditioning apparatuses 2 can be added to update the air-conditioning apparatus model information data table 112.

Figure 6:
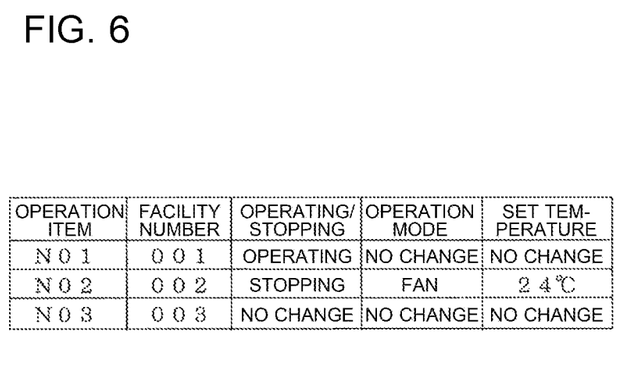
FIG. 6 shows data contents of a communication disrupted air-conditioning operation data table 113 according to Embodiment 1.

FIG. 6 shows data contents of the communication disrupted air-conditioning operation data table 113 according to Embodiment 1. In the communication disrupted air-conditioning operation data table 113, air-conditioning operation data in which control contents for when a communication disruption occurs between the remote monitoring device 1 and the cloud server 5 are defined for each of the air-conditioning apparatuses 2 is stored. FIG. 6 shows an example in which operation item number, facility number, facility number of each air-conditioning apparatus 2, operation instruction, operation mode, and set temperature are stored as the air-conditioning operation data.

Furthermore, the monitoring-side input unit 12 shown in FIG. 1 includes a dedicated connector (not shown), for example. The monitoring-side input unit 12 functions as an interface for an external device connected to the connector for inputting signals including data transmitted from the external device. The signals include data of firmware associated with update of the remote monitoring device 1, part of data of the monitoring-side data storage unit 11, and other data.

The monitoring-side dedicated line communication unit 13 functions as an interface for the remote monitoring device 1 for performing communication by signals including data via the dedicated communication line 4. In Embodiment 1, the remote monitoring device 1 is connected to the air-conditioning apparatuses 2 via the dedicated communication lines 4. Under the control of the monitoring-side control unit 10, the monitoring-side dedicated line communication unit 13 performs signal communication with each of the air-conditioning apparatuses 2 to exchange data such as operation contents input from the user and operation conditions of the corresponding air-conditioning apparatus 2.

The monitoring-side line communication unit 14 functions as an interface for the remote monitoring device 1 for performing communication by signals including data via the LAN 7. In Embodiment 1, the remote monitoring device 1 is connected to the router 6 via the LAN 7. As described above, the router 6 is connected to the public communication line 7. Thus, under the control of the monitoring-side control unit 10, the monitoring-side line communication unit 14 performs signal communication with the cloud server 5. Here, in Embodiment 1, a case where the monitoring-side line communication unit 14 is connected to the router 6 by a wired connection is explained; however, the connection is not limited to the wired connection and a wireless communication connection may be used.

The mobile terminal 3 of Embodiment 1 is a device that the user has, such as a mobile phone, smartphone, or any portable device. The mobile terminal 3 is capable of communicating with the cloud server 5 by signals including data via the public communication line 7. In this case, the user who uses the mobile terminal 3 is, for example, a general user who operates basic functions of the air-conditioning apparatuses 2, a service person who performs maintenance on the air-conditioning apparatuses 2, or a manager who manages the air-conditioning apparatuses 2.

The mobile terminal 3 includes a terminal-side communication unit 30, a terminal-side display unit 31, a terminal-side input unit 32, a terminal-side control unit 33, and a terminal-side data storage unit 34. The terminal-side communication unit 30 performs communication, by signals including various kinds of data, with the cloud server 5 via the public communication line 7. In this case, the data associated with the communication of the terminal-side communication unit 30 specifically is setting data in the terminal-side data storage unit 34, which will be described later.

The terminal-side display unit 31 includes a liquid crystal display. Under the control of the terminal-side control unit 33, the terminal-side display unit 31 displays contents of data included in the signals transmitted from the cloud server 5 and operation screens of the air-conditioning apparatuses 2.

The terminal-side input unit 32 includes a mouse or a touch panel, for example. The terminal-side display unit 31 transmits instructions input by the user and signals including data to the terminal-side control unit 33. For example, when a touch panel is adopted, a transparent sheet-like capacitive sensor, which detects a change in capacitance, is mounted on the liquid crystal display of the terminal-side display unit 31. When a touch surface of the capacitive sensor is touched (pressed) by a fingertip of the user or a dedicated pen, the coordinate data of the touched position is transmitted to the terminal-side control unit 33. Based on the touched position, the terminal-side control unit 33 determines a content input by the user.

As described above, when the user, such as a manger, performs an input operation via the terminal-side input unit 32, a signal corresponding to the operation content is transmitted to the terminal-side control unit 33. Objects to be operated are the same as the contents of the various tables of the terminal-side data storage unit 34, which will be described later.

The terminal-side control unit 33 controls each unit included in the mobile terminal 3 to control the entire mobile terminal 3. For example, when the mobile terminal 3 is a smartphone, the terminal-side control unit 33 executes application programs, which are executable on the smartphone. Then, the terminal-side control unit 33 processes operations input by the user via the terminal-side input unit 32. In addition, via the terminal-side communication unit 30, the terminal-side control unit 33 transmits operation instruction signals to the cloud server 5 and processes various kinds of data included in the signals transmitted from the cloud server 5. Then, the terminal-side control unit 33 performs processing for the processed data, such as reflecting the processed data in the display contents of the terminal-side display unit 31 and storing the processed data in the terminal-side data storage unit 34, which will be described later. In this case, similarly to the monitoring-side control unit 10, the terminal-side control unit 33 also includes, as hardware, a control arithmetic processing device, such as a CPU, and storage devices, such as a RAM and a ROM, for example.

Similarly to the abovementioned monitoring-side data storage unit 11 shown in FIG. 2, the operation condition data table 110, the history data table 111, the air-conditioning apparatus model information data table 112, and the communication disrupted air-conditioning operation data table 113 are stored in the terminal-side data storage unit 34. Here, the terminal-side control unit 33 may cause the terminal-side data storage unit 34 to store data that is stored in another mobile terminal 3 held by another user and is transferred by electronic mail or other means. By using application programs, the terminal-side control unit 33 can manage or edit the stored data, and can manage the stored data for each property.

The cloud server 5 provides a cloud service, and collects and analyzes data, which is related to the operation of the air-conditioning apparatuses 2 and included in the signals from the remote monitoring device 1, to perform a feedback control, thereby managing the air-conditioning apparatuses 2, which are objects to be managed. Although, in FIG. 1, the cloud server 5 is connected to one remote monitoring device 1 via the public communication line 7, the cloud server 5 is connected to and communicates with more than one remote monitoring device 1 to manage air-conditioning apparatuses 2, which are targets for the service. The cloud server 5 includes a server-side communication unit 50, a server-side control unit 51, and a server-side data storage unit 52.

The server-side communication unit 50 functions as an interface for the cloud server 5 for performing communication by signals including data via the public communication line 7. The server-side control unit 51 controls each unit included in the cloud server 5 to control the entire cloud server 5. In this case, similarly to the monitoring-side control unit 10, the server-side control unit 51 also includes, as hardware, a control arithmetic processing device, such as a CPU, and storage devices, such as a RAM and a ROM, for example.

Similarly to the abovementioned monitoring-side data storage unit 11 shown in FIG. 2, the operation condition data table 110, the history data table 111, the air-conditioning apparatus model information data table 112, and the communication disrupted air-conditioning operation data table 113 are stored in the server-side data storage unit 52. In this case, the data stored in the server-side data storage unit 52 is updated by using various kinds of data included in the signals transmitted from the remote monitoring device 1 and the mobile terminal 3.

Figure 7:
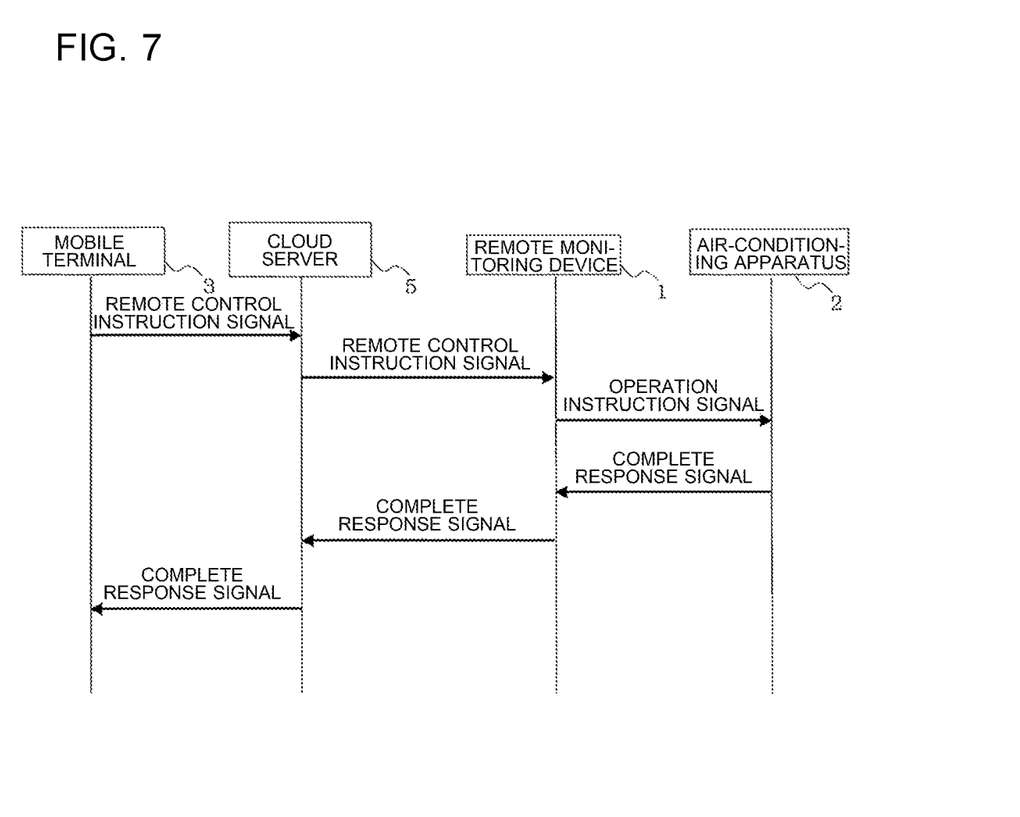
FIG. 7 is a diagram illustrating an example of signal flows when an air-conditioning apparatus 2 is remotely operated from a mobile terminal 3 according to Embodiment 1.

FIG. 7 is a diagram illustrating an example of signal flows when one of the air-conditioning apparatuses 2 is remotely operated from the mobile terminal 3 according to Embodiment 1. When the air-conditioning apparatus 2 is remotely operated from the mobile terminal 3, the terminal-side communication unit 30 in the mobile terminal 3 transmits a remote control instruction signal to the cloud server 5 via the public communication line 7.

In the cloud server 5, the server-side communication unit 50 receives the transmitted signal. Then, the cloud server 5 transmits the remote control instruction signal to the remote monitoring device 1 via the public communication line 7. The server-side control unit 51 stores data included in the remote control instruction signal in the server-side data storage unit 52.

In the remote monitoring device 1, the monitoring-side line communication unit 14 receives the remote control instruction signal transmitted from the cloud server 5. Then, the monitoring-side control unit 10 stores data related to the signal in the monitoring-side data storage unit 11. In addition, the monitoring-side control unit 10 performs processing of generating an operation instruction signal based on the remote control instruction. The monitoring-side dedicated line communication unit 13 transmits the operation instruction signal generated by the monitoring-side control unit 10 to the air-conditioning apparatus 2 via the dedicated communication line 4.

The air-conditioning apparatus 2 performs operation based on the operation instruction signal. The air-conditioning apparatus 2 then transmits a completion response signal indicating a signal reception to the remote monitoring device 1 via the dedicated communication line 4. The monitoring-side dedicated line communication unit 13 receives the completion response signal from the air-conditioning apparatus 2. Then, the monitoring-side line communication unit 14 transmits the completion response signal to the cloud server 5 via the public communication line 7. In the cloud server 5, the server-side communication unit 50 receives the transmitted completion response signal. Then, the cloud server 5 transmits the completion response signal to the mobile terminal 3 via the public communication line 7.

Figure 8:
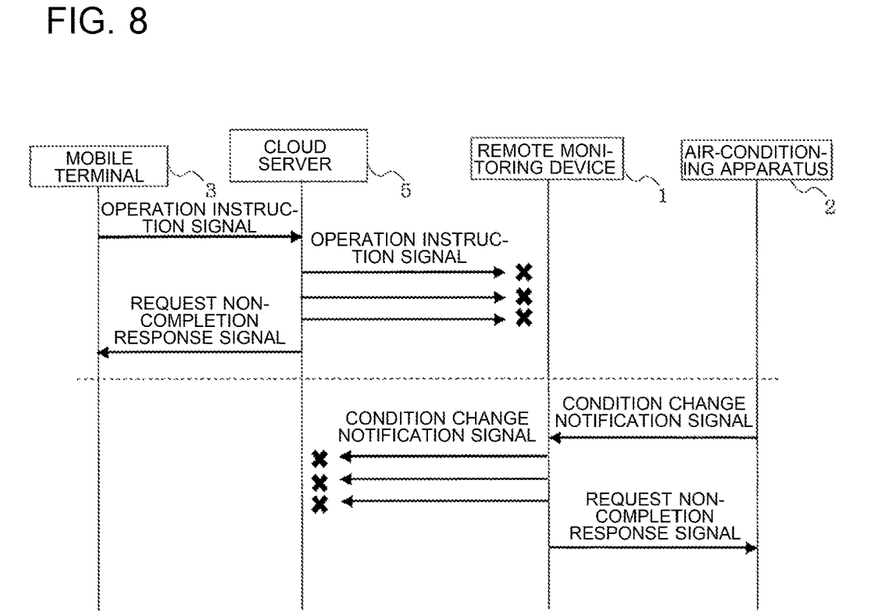
FIG. 8 is a diagram illustrating an example of signal flows of a case where a communication disruption occurs according to Embodiment 1.

FIG. 8 is a diagram illustrating an example of signal flows of a case where a communication disruption occurs according to Embodiment 1. In a case where, for example, a communication between the cloud server 5 and the remote monitoring device 1 is disrupted due to a failure of the router 6, no completion response signal is transmitted from the remote monitoring device 1 even when the server-side communication unit 50 transmits the remote control instruction signal transmitted from the mobile terminal 3 to the remote monitoring device 1. When the server-side communication unit 50 cannot receive a completion response signal even when transmitting the remote control instruction signal several times, the server-side communication unit 50 then transmits a request non-completion response signal to the mobile terminal 3 via the public communication line 7.

In addition, when the air-conditioning apparatus 2 changes the operation condition, the air-conditioning apparatus 2 transmits a condition change notification signal to the remote monitoring device 1 via the dedicated communication line 4. In the remote monitoring device 1, the monitoring-side line communication unit 14 transmits the condition change notification signal received by the monitoring-side dedicated line communication unit 13 to the cloud server 5 via the public communication line 7. When the communication is disrupted, no response signal is transmitted from the cloud server 5 even when the monitoring-side line communication unit 14 transmits the condition change notification signal. In the remote monitoring device 1, when the monitoring-side line communication unit 14 cannot receive a response signal even when transmitting the condition change notification signal several times, the monitoring-side dedicated line communication unit 13 transmits a request non-completion response signal to the air-conditioning apparatus 2 via the dedicated communication line 4.

In a case where the user having the mobile terminal 3 is present at a place where the air-conditioning apparatus 2 is installed, the user can input an operation from a remote controller (not shown), for example, provided to the air-conditioning apparatus 2 even when the communication is disrupted and enters an abnormal state. Thus, the air-conditioning apparatus 2 can immediately respond to the operation given by the user. However, in a case where the user is located outdoors or at a remote place, it is difficult for the user to give an operation to the air-conditioning apparatus 2.

In a case where a signal is not transmitted from the cloud server 5, the air-conditioning apparatus 2 may continue the operation in a time period, such as at night, where no operation is needed, and thus may consume wasteful power. In addition, this case may cause a situation that the air-conditioning apparatus 2 installed at a low-temperature warehouse or a server room keeps the operation without changing the cooling temperature even when the air-conditioning apparatus 2 needs to cool the indoor space to a fixed temperature against outdoor temperature fluctuation in the daytime.

To avoid these problems, the remote monitoring device 1 of Embodiment 1 operates and controls the air-conditioning apparatus 2 to follow the user's intention of use even when a signal is not transmitted from the cloud server 5 due to a communication disruption.

Figure 9:
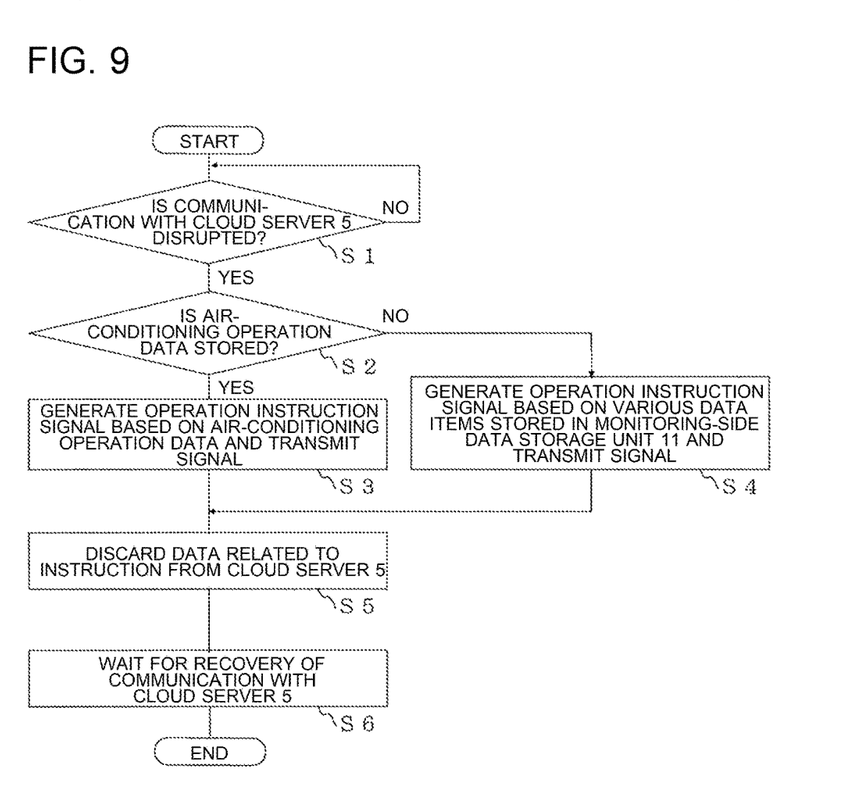
FIG. 9 is a flowchart showing an operating procedure conducted by the remote monitoring device 1 according to Embodiment 1 when a communication disruption occurs.

FIG. 9 is a flowchart showing an operating procedure conducted by the remote monitoring device 1 according to Embodiment 1 when a communication disruption occurs. This procedure is performed mainly by the monitoring-side control unit 10 of the remote monitoring device 1. The monitoring-side control unit 10 performs communication disruption determination processing to determine whether a communication with the cloud server 5 is disrupted (step S1). Examples for determination of whether a communication is disrupted are described below. The remote monitoring device 1 periodically receives a request for data update from the cloud server 5. When the monitoring-side control unit 10 of the remote monitoring device 1 determines that the request for update is not received from the cloud server 5 for a certain time period, the monitoring-side control unit 10 determines that a communication disruption has occurred. In addition, as described above, when one of the air-conditioning apparatuses 2 changes its operation condition, the remote monitoring device 1 transmits a condition change notification signal to the cloud server 5. For the condition change notification signal, a completion response signal is transmitted from the cloud server 5 to the remote monitoring device 1 in a normal case. When the monitoring-side control unit 10 of the remote monitoring device 1 determines that a completion response is not received from the cloud server 5 due to a communication disruption with the cloud server 5 even when the condition change notification signal is retransmitted a fixed number of times, the monitoring-side control unit 10 determines that a communication disruption has occurred. When determining that a communication with the cloud server 5 is not disrupted, the monitoring-side control unit 10 continues the communication disruption determination processing.

Meanwhile, when the monitoring-side control unit 10 determines that a communication with the cloud server 5 is disrupted, the monitoring-side control unit 10 determines whether air-conditioning operation data, such as an operation item, is stored in the communication disrupted air-conditioning operation data table 113 of the monitoring-side data storage unit 11 (step S2).

The monitoring-side control unit 10 determines that air-conditioning operation data is stored, the monitoring-side control unit 10 generates an operation instruction signal based on the stored air-conditioning operation data. Then, to the air-conditioning apparatus 2 to be operated, the monitoring-side control unit 10 transmits the generated operation instruction signal via the monitoring-side dedicated line communication unit 13 and the dedicated communication line 4 (step S3).

Meanwhile, when the monitoring-side control unit 10 determines that air-conditioning operation data is not stored, the monitoring-side control unit 10 generates a temporary operation instruction signal, which can be used for the current communication disruption, based on the various data items stored in the monitoring-side data storage unit 11, as described later. Then, to the air-conditioning apparatus 2 to be operated, the monitoring-side control unit 10 transmits the generated operation instruction signal via the monitoring-side dedicated line communication unit 13 and the dedicated communication line 4 (step S4).

After transmitting the operation instruction signal, the monitoring-side control unit 10 discards data related to the remote control instruction signal transmitted from the cloud server 5 (step S5). Then, the monitoring-side control unit 10 continues the control based on the operation instruction signal and waits for the communication with the cloud server 5 to recover (step S6).

As described above, the air-conditioning operation data, such as an operation item, is set in the communication disrupted air-conditioning operation data table 113, and when the data is not stored in the table, the monitoring-side control unit 10 generates an air-conditioning operation signal based on the various data items stored in the monitoring-side data storage unit 11. In the remote monitoring device 1 of Embodiment 1, the monitoring-side control unit 10 generates the air-conditioning operation signal based on data input by the user or data obtained by machine learning, for example.

The monitoring-side control unit 10 determines whether each of the air-conditioning apparatuses 2 is used for people or for articles based on the usage purpose data stored in the air-conditioning apparatus model information data table 112. When the monitoring-side control unit 10 determines that the air-conditioning apparatus 2 is used for articles, the monitoring-side control unit 10 generates air-conditioning operation data suitable for a target object. For example, when the air-conditioning apparatuses 2 is used for cooling objects such as computers or articles in a low-temperature warehouse, the monitoring-side control unit 10 generates the air-conditioning operation data that causes the air-conditioning apparatus 2 to maintain the operation condition without stopping. In this manner, the monitoring-side control unit 10 controls the air-conditioning apparatus 2 to prevent deterioration in the condition of the target object.

When the monitoring-side control unit 10 determines that the air-conditioning apparatus 2 is used for people, the monitoring-side control unit 10 generates the air-conditioning operation data from the various data items in the monitoring-side data storage unit 11, such as conditions of the air-conditioning apparatus 2 like the operation condition and the presence or absence of a failure, instructions from users, schedules, and the weather or outdoor temperature. For example, when the monitoring-side control unit 10 determines that the weather or outdoor temperature of the day at which a communication disruption occurs is similar to that of the previous day, the monitoring-side control unit 10 generates an operation instruction signal for controlling the air-conditioning apparatus 2 to thereby perform the same operation as the operation of the same time period of the previous day. When schedule data is stored in the operation condition data table 110, the monitoring-side control unit 10 generates an operation instruction signal based on the schedule data. In addition, the monitoring-side control unit 10 determines when the air-conditioning apparatus 2 needs to be operated based on the date and time data, such as the day of the week or month.

As described above, according to the remote monitoring device 1 of Embodiment 1, the monitoring-side control unit 10 determines whether or not a signal communication with the cloud server 5 is enabled. Then, when determining that a signal is not transmitted due to a communication disruption with the cloud server 5, the monitoring-side control unit 10 performs processing for transmitting an operation instruction signal to the air-conditioning apparatus 2 based on the air-conditioning operation data stored in the communication disrupted air-conditioning operation data table 113. Therefore, the remote monitoring device 1 is capable of securing operation as expected by the user even when the communication with the cloud server 5 is disrupted.

Furthermore, when the monitoring-side control unit 10 determines that no air-conditioning operation data is stored, the monitoring-side control unit 10 generates an operation instruction signal from various kinds of data stored in the monitoring-side data storage unit 11. Thus, the remote monitoring device 1 can effectively operate and control the air-conditioning apparatuses 2 even when a communication with the cloud server 5 is disrupted. At this time, the monitoring-side control unit 10 changes the contents of the operation instruction signal depending on whether the target air-conditioning apparatus 2 is used for people or for articles. Consequently, damages, especially on the articles, can be prevented.

Embodiment 2

Although no explanation is made in the abovementioned Embodiment 1, when a communication disruption between the remote monitoring device 1 and the cloud server 5 is recovered, the remote monitoring device 1 may provide feedback about the processing performed at the communication disruption occurrence and the processing performed during the communication disruption.

Embodiment 3

In the above Embodiment 1, the monitoring-side control unit 10 generates an operation instruction signal based on the operation condition data in a case where no air-conditioning operation data is stored in the communication disrupted air-conditioning operation data table 113, but the present disclosure is not limited to such a case. The monitoring-side control unit 10 may generate an operation instruction signal based on the operation condition data when the monitoring-side control unit 10 determines that communication with the cloud server 5 is disrupted.

REFERENCE SIGNS LIST

1: remote monitoring device, 10: monitoring-side control unit, 11: monitoring-side data storage unit, 12: monitoring-side input unit, 13: monitoring-side dedicated line communication unit, 14: monitoring-side line communication unit, 2, 2A, 2B: air-conditioning apparatus, 3: mobile terminal, 30: terminal-side communication unit, 31: terminal-side display unit, 32: terminal-side input unit, 33: terminal-side control unit, 34: terminal-side data storage unit, 4: dedicated communication line, 5: cloud server, 50: server-side communication unit, 51: server-side control unit, 52: server-side data storage unit, 6: router, 7: public communication line, 110: operation condition data table, 111: history data table, 112: air-conditioning apparatus model information data table, 113: communication disrupted air-conditioning operation data table

The invention claimed is:
1. A remote monitoring device being configured to communicate with an external device via a public communication line and send, to an air-conditioning apparatus to be operated, an operation instruction signal for operating the air-conditioning apparatus, comprising:
 a monitoring-side line communication interface configured to communicate with the external device via the public communication line;
 a monitoring-side dedicated line communication interface configured to communicate with the air-conditioning apparatus via a dedicated communication line;
 a monitoring-side data storage storing air-conditioning operation data that is set by a user of the air-conditioning apparatus and indicates operation contents of the air-conditioning apparatus for a case of a communication disruption, the monitoring-side data storage stores data transmitted from the air-conditioning apparatus; and
 a monitoring-side control unit including a processor and a memory and is configured to
  determine whether a communication with the external device via the public communication line is disrupted,
  responsive to determining that the communication is disrupted,
   determine whether air-conditioning operation data is stored in the monitoring-side data storage,
   responsive to determining that the air-conditioning operation data is stored, generate the operation instruction signal based on the air-conditioning operation data which is stored, responsive to determining that the air-conditioning operation data is not stored, generate the operation instruction signal based on the data transmitted from the air-conditioning apparatus, and send the operation instruction signal which is generated to the air-conditioning apparatus from the monitoring-side dedicated line communication interface, responsive to determining that the communication is disrupted and the air-conditioning operation data is not stored, generate the operation instruction signal based on the data transmitted from the air-conditioning apparatus.

2. The remote monitoring device of claim 1, wherein the monitoring-side control unit is further configured to responsive to determining that the communication with the external device is disrupted, discard an instruction for the air-conditioning apparatus included in a signal transmitted from the external device.

3. An air-conditioning system comprising:
the remote monitoring device of claim 1; and
a cloud server configured to communicate with the remote monitoring device via a public communication line and send a signal to the remote monitoring device.

4. A remote monitoring device being configured to communicate with an external device via a public communication line and send, to an air-conditioning apparatus to be operated, an operation instruction signal for operating the air-conditioning apparatus, comprising:

a monitoring-side line communication interface configured to communicate with the external device via the public communication line;

a monitoring-side dedicated line communication interface configured to communicate with the air-conditioning apparatus via a dedicated communication line;

a monitoring-side data storage storing data related to operation conditions of the air-conditioning apparatus transmitted from the air-conditioning apparatus; and a monitoring-side control unit including a processor and a memory and configured to determine whether a communication with the external device via the public communication line is disrupted, responsive to determining that the communication is disrupted, generate the operation instruction signal based on the data transmitted from the air-conditioning apparatus, and send the operation instruction signal which is generated to the air-conditioning apparatus from the monitoring-side dedicated line communication interface.

5. The remote monitoring device of claim 4, wherein
the monitoring-side data storage stores data related to past and current operation conditions of the air-conditioning apparatus and data related to a model of the air-conditioning apparatus, as the data transmitted from the air-conditioning apparatus.

6. The remote monitoring device of claim 5, wherein
the monitoring-side control unit is further configured to determine whether the air-conditioning apparatus is used for people and alternatively for articles from the data related to the model of the air-conditioning apparatus, and generate the operation instruction signal based on the determination.

7. The remote monitoring device of claim 4, wherein
the monitoring-side data storage stores data related to past and current operation conditions of the air-conditioning apparatus and data related to a model of the air-conditioning apparatus, as the data transmitted from the air-conditioning apparatus.

8. The remote monitoring device of claim 7, wherein
the monitoring-side control unit is further configured to determine whether the air-conditioning apparatus is used for people and alternatively for articles from the data related to the model of the air-conditioning apparatus, and generate the operation instruction signal based on the determination.

9. The remote monitoring device of claim 4, wherein
the monitoring-side control unit is further configured to responsive to determining that the communication with the external device is disrupted, discard an instruction for the air-conditioning apparatus included in a signal transmitted from the external device.

10. An air-conditioning system comprising:
the remote monitoring device of claim 4; and
a cloud server configured to communicate with the remote monitoring device via a public communication line and send a signal to the remote monitoring device.

* * * * *